(12) United States Patent
Kim et al.

(10) Patent No.: US 8,149,762 B2
(45) Date of Patent: Apr. 3, 2012

(54) SATELLITE, MOBILE TERMINAL, AND COMPLEMENTARY TERRESTRIAL COMPONENT IN OFDM BASED MULTI-BEAM SATELLITE SYSTEM REUSING THE SAME FREQUENCY BAND FOR ALL THE BEAMS, AND COMMUNICATION METHOD THEREOF

(75) Inventors: Hee Wook Kim, Daejeon (KR); Kunseok Kang, Daejeon (KR); Do-Seob Ahn, Daejeon (KR); Ho Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 420 days.

(21) Appl. No.: 12/537,731

(22) Filed: Aug. 7, 2009

(65) Prior Publication Data

US 2010/0128656 A1 May 27, 2010

(30) Foreign Application Priority Data

Nov. 25, 2008 (KR) .................. 10-2008-0117492

(51) Int. Cl.
*H04B 7/185* (2006.01)
(52) U.S. Cl. ................... 370/316; 455/12.1
(58) Field of Classification Search .......... 370/316, 370/203, 295, 308, 400, 252, 340, 329, 260; 455/452.2, 456.1, 517, 506, 12.1, 13.1, 13.4, 455/456.2, 456.3, 427, 429, 430, 431, 432.1, 455/447, 448, 452.1, 446, 13, 3, 15, 16, 17
See application file for complete search history.

(56) References Cited

U.S. PATENT DOCUMENTS

| | | | |
|---|---|---|---|
| 2005/0282542 A1 | 12/2005 | Karabinis | |
| 2006/0039312 A1* | 2/2006 | Walton et al. | 370/319 |
| 2006/0052139 A1* | 3/2006 | Teo et al. | 455/562.1 |
| 2006/0088007 A1* | 4/2006 | Jalali et al. | 370/334 |
| 2006/0093067 A1* | 5/2006 | Jalali et al. | 375/299 |
| 2006/0109865 A1* | 5/2006 | Park et al. | 370/482 |
| 2006/0227851 A1* | 10/2006 | Shattil | 375/133 |
| 2007/0183523 A1* | 8/2007 | Koo et al. | 375/261 |
| 2007/0232298 A1* | 10/2007 | Karabinis | 455/427 |
| 2008/0159419 A1* | 7/2008 | Smith et al. | 375/260 |
| 2010/0020747 A1* | 1/2010 | Xia et al. | 370/328 |

FOREIGN PATENT DOCUMENTS

KR 10-0524378 10/2005
WO 99/31832 6/1999

OTHER PUBLICATIONS

"Recent Advances That May Revitalize Mobile Satellite Systems," Karabinis et al., www.msvlp.com, 6pp.

* cited by examiner

*Primary Examiner* — Melody Mehrpour
(74) *Attorney, Agent, or Firm* — Staas & Halsey LLP

(57) ABSTRACT

Provided is a communication method of a mobile terminal in an orthogonal frequency division multiplexing (OFDM) based multi-beam satellite system reusing the same frequency band for all the beams, the method including: receiving location information of the mobile terminal from a satellite to determine a location of the mobile terminal within multiple beams; determining a subcarrier group for a communication with the satellite according to the location of the mobile terminal within the multiple beams; and communicating with the satellite using the subcarrier group for the communication with the satellite.

15 Claims, 16 Drawing Sheets

FIG. 1
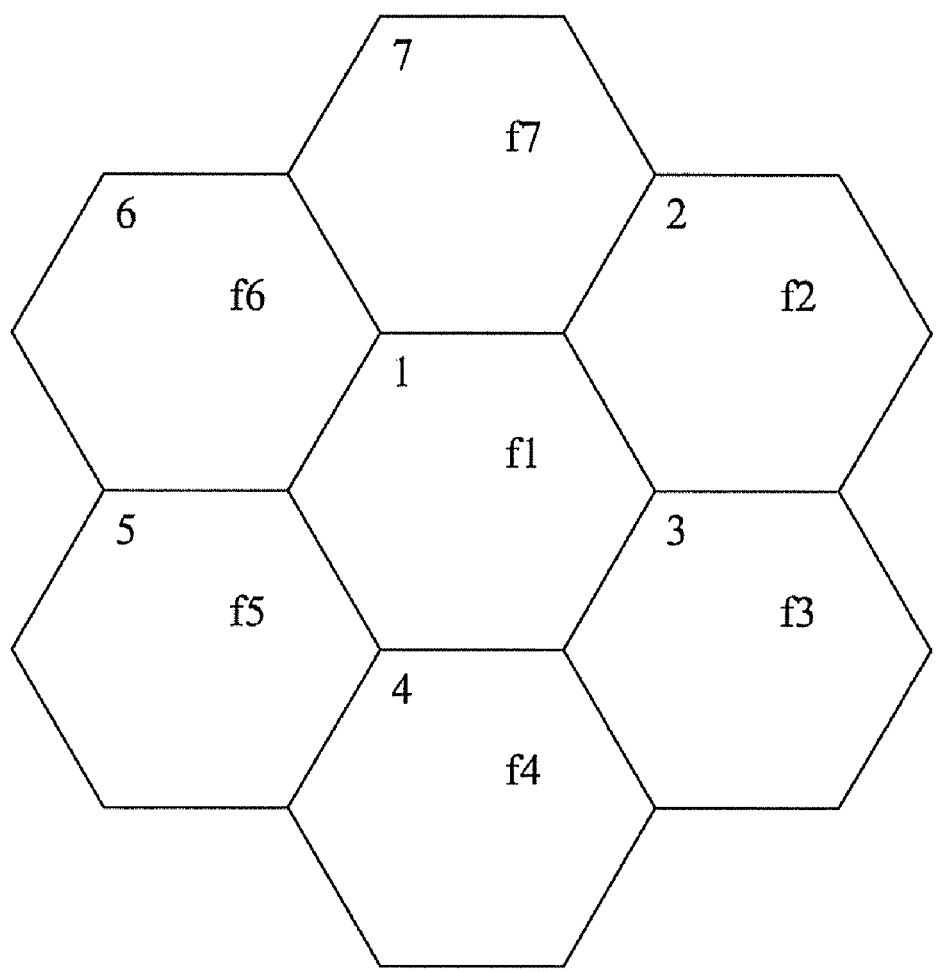
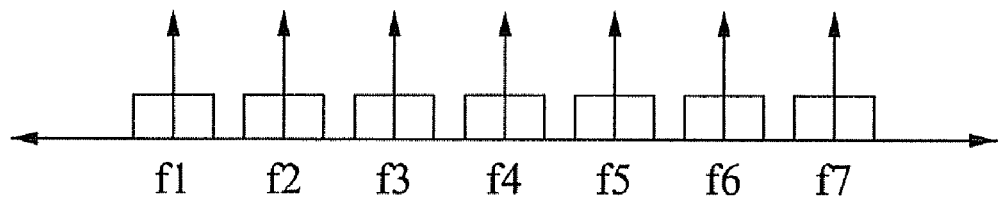

FIG. 2
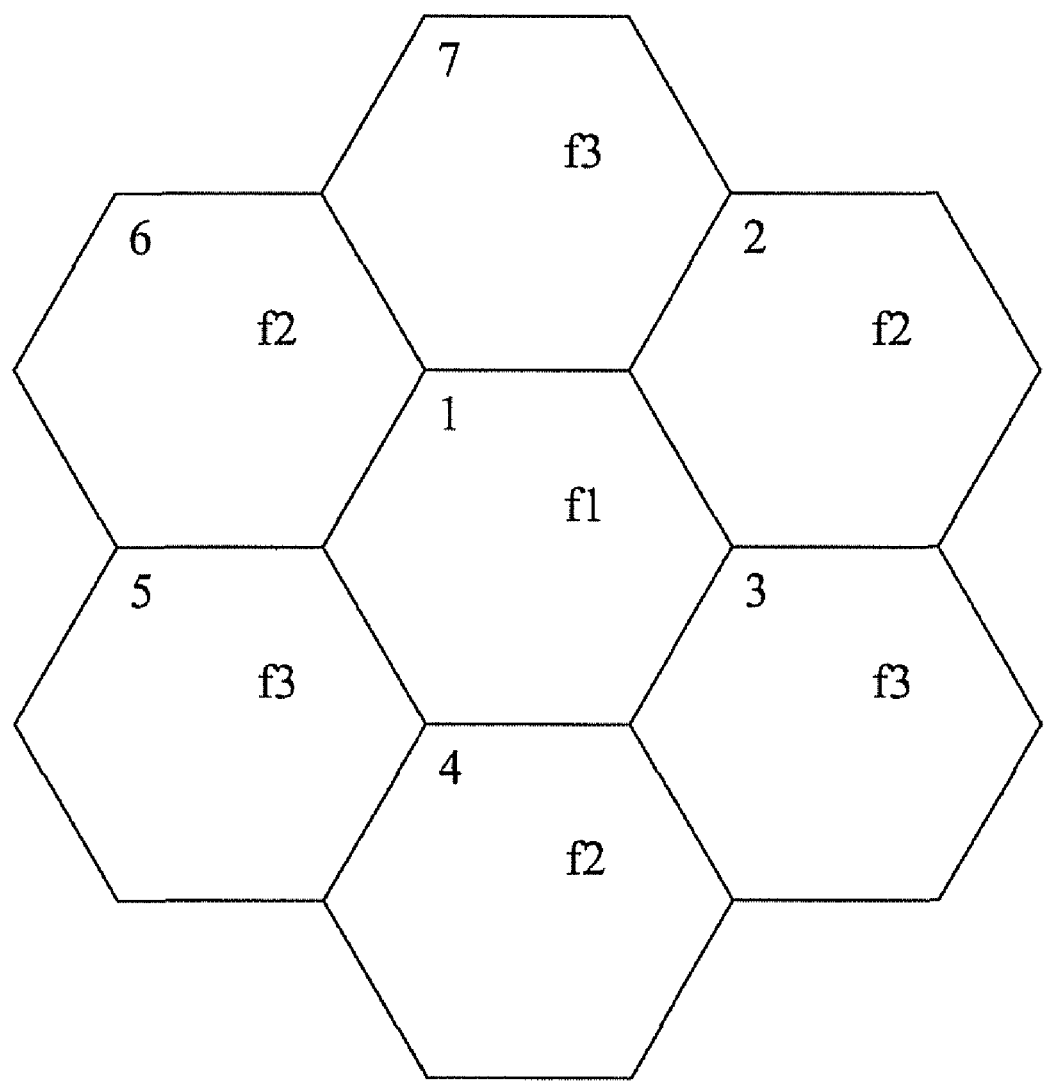
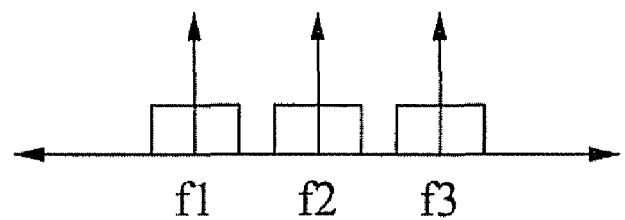

FIG. 10
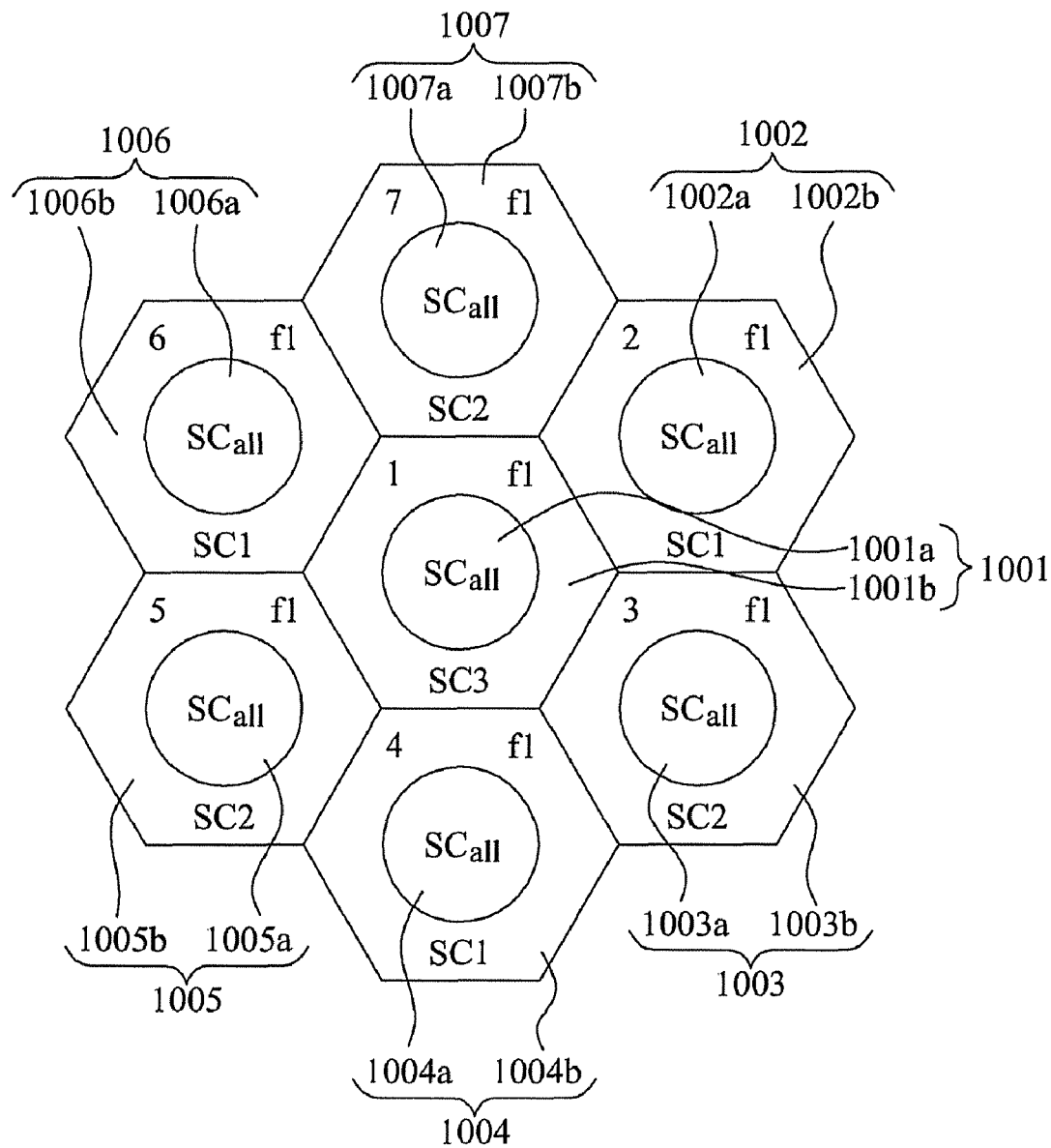
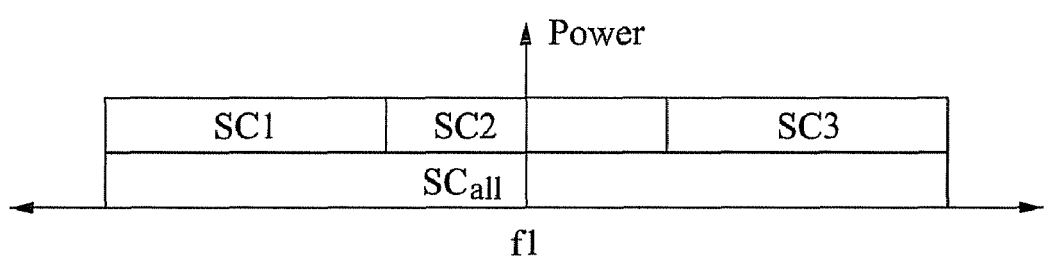

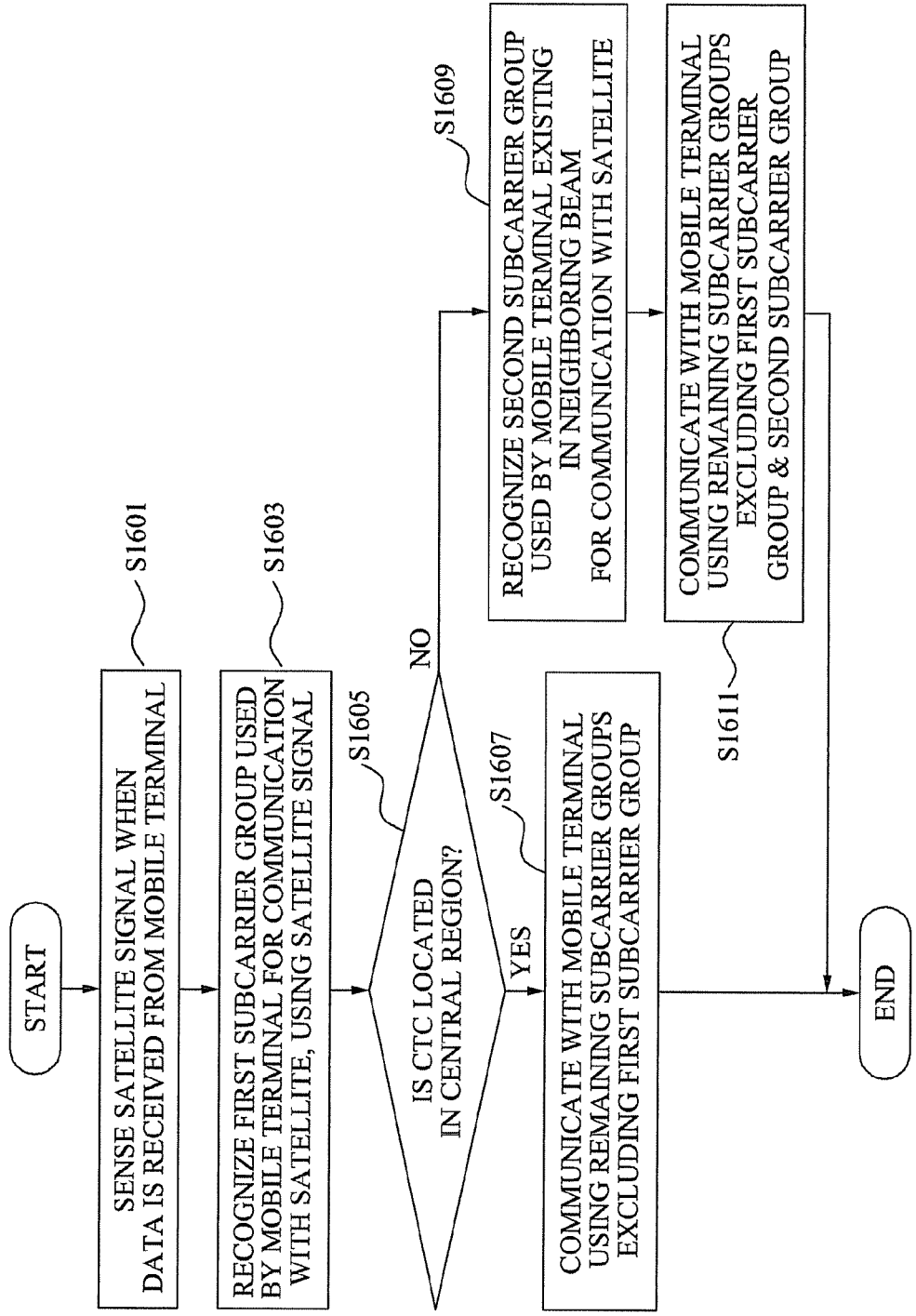

SATELLITE, MOBILE TERMINAL, AND COMPLEMENTARY TERRESTRIAL COMPONENT IN OFDM BASED MULTI-BEAM SATELLITE SYSTEM REUSING THE SAME FREQUENCY BAND FOR ALL THE BEAMS, AND COMMUNICATION METHOD THEREOF

CROSS-REFERENCE TO RELATED APPLICATION

This application claims the benefit of Korean Patent Application No. 10-2008-0117492, filed on Nov. 25, 2008, in the Korean Intellectual Property Office, the disclosure of which is incorporated herein by reference.

BACKGROUND

1. Field of the Invention

The present invention relates to a satellite, a mobile terminal, and a complementary terrestrial component in an orthogonal frequency division multiplexing (OFDM) based multi-beam satellite system reusing the same frequency band for all the beams, and a communication method thereof.

2. Description of the Related Art

A mobile satellite communication apparatus may provide telecommunication services in urban areas and the suburbs via a terrestrial/satellite convergence network, using a complementary terrestrial component such as a repeater, a complementary ground component, an ancillary terrestrial component, and the like. In this instance, the mobile satellite communication apparatus may provide telecommunication services via a satellite in the countryside or the suburbs where a line of sight (LOS) is secured. In the urban areas or indoor environments where a satellite signal is not secured, the mobile satellite communicate apparatus may provide telecommunication services using the complementary terrestrial component.

Like a terrestrial cellular mobile communication system based on a base station, a mobile satellite communication system using a multi-beam satellite may divide a service area into a plurality of cells using multiple beams. A mobile terminal may receive a service via a frequency corresponding to a beam where the mobile terminal is located.

FIG. 1 illustrates a beam plan that is used in an existing mobile satellite communication apparatus and of which a frequency reuse rate is 1/7.

Referring to FIG. 1, as a mobile satellite communication system provides a communication service using a difference frequency for each beam, seven frequencies may be required to provide the communication service in seven beams, respectively. Here, the mobile satellite communication system may use all the orthogonal frequency division multiplexing (OFDM) subcarriers for each frequency in each beam. However, in the mobile satellite communication system, every time the mobile terminal moves from a beam to another beam, a frequency is changed and thus a handover time may increase. Also, as a broadband service is provided, a use frequency may increase.

In order to outperform the above disadvantages, as shown in FIG. 2, the mobile satellite communication system may provide the communication service using a beam plan of which a frequency reuse rate is 1/3. As described above, every time the mobile terminal moves between beams, the frequency is changed and thus the handover time may increase. Also, as the broadband service is provided, the use frequency may increase.

Accordingly, there is a need for a mobile satellite communication apparatus and method that may increase a frequency reuse rate and thereby may enhance spectral efficiency.

SUMMARY

An aspect of the present invention provides a satellite, a mobile terminal, and a complementary terrestrial component in an orthogonal frequency division multiplexing (OFDM) based multi-beam satellite system reusing the same frequency band for all the beams, and a communication method thereof that may reuse a fractional frequency for a subcarrier group unused in another beam as a mobile terminal and a satellite perform a communication using the same frequency band in multiple beams and also using a different subcarrier group for each beam, and may perform a communication between the mobile terminal and a complementary terrestrial component using an unused subcarrier group, when the communication is performed between the mobile terminal and the satellite in each beam, and thereby enhance spectral efficiency.

According to an aspect of the present invention, there is provided a mobile terminal in an orthogonal frequency division multiplexing (OFDM) based multi-beam satellite system reusing the same frequency band for all the beams, the mobile terminal including: a location decision unit to receive location information of the mobile terminal from a satellite, and to determine a location of the mobile terminal within multiple beams; a subcarrier group decision unit to determine a subcarrier group for a communication with the satellite according to the location of the mobile terminal within the multiple beams; and a communication unit to communicate with the satellite using the subcarrier group for the communication with the satellite.

According to another aspect of the present invention, there is provided a communication method of a mobile terminal in an OFDM based multi-beam satellite system reusing the same frequency band for all the beams, the method including: receiving location information of the mobile terminal from a satellite to determine a location of the mobile terminal within multiple beams; determining a subcarrier group for a communication with the satellite according to the location of the mobile terminal within the multiple beams; and communicating with the satellite using the subcarrier group for the communication with the satellite.

Additional aspects, features, and/or advantages of the invention will be set forth in part in the description which follows and, in part, will be apparent from the description, or may be learned by practice of the invention.

EFFECT

According to embodiments of the present invention, there may be provided a satellite, a mobile terminal, and a complementary terrestrial component in an orthogonal frequency division multiplexing (OFDM) based multi-beam satellite system reusing the same frequency band for all the beams, and a communication method thereof that may reuse a fractional frequency for a subcarrier group unused in another beam as a mobile terminal and a satellite perform a communication using the same frequency band in multiple beams and also using a different subcarrier group for each beam, and may perform a communication between the mobile terminal and a complementary terrestrial component using an unused subcarrier group, when the communication is performed between the mobile terminal and the satellite in each beam, and thereby enhance a frequency use efficiency.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 1 illustrates a beam plan that is used in an existing mobile satellite communication apparatus and of which a frequency reuse rate is 1/7;

FIG. 2 illustrates a beam plan that is used in the existing mobile satellite communication apparatus and of which a frequency reuse rate is 1/3;

FIG. 10 illustrates a beam plan that is used in a mobile satellite communication apparatus and of which a frequency reuse rate is 1 according to another embodiment of the present invention;

FIG. 16 is a flowchart illustrating a communication method of a complementary terrestrial component in a mobile satellite communication apparatus to another embodiment of the present invention.

DETAILED DESCRIPTION

Figure 3:
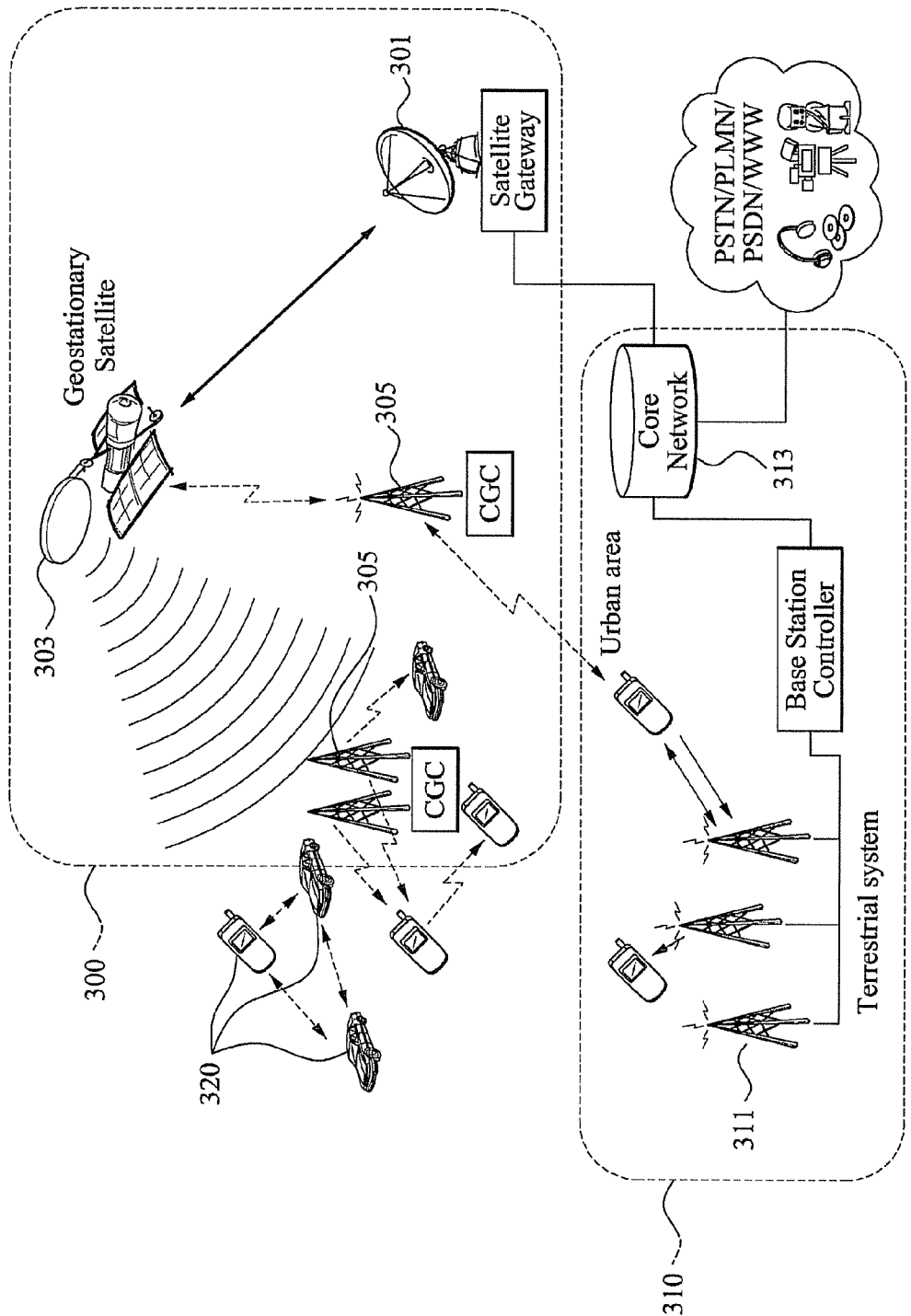
FIG. 3 illustrates a configuration of a mobile satellite communication apparatus with a complementary terrestrial component applying a fractional frequency reuse technique according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a satellite, a mobile terminal, and a complementary terrestrial component in an orthogonal frequency division multiplexing (OFDM) based multi-beam satellite system reusing the same frequency band for all the beams, and a communication method thereof according to embodiments of the present invention will be described in detail with reference to the accompanying drawings. The embodiments of the present invention may be applicable to all the satellite mobile systems using any type of complementary terrestrial components such as a complementary ground component (CGC), an ancillary terrestrial component (ATC), and a repeater of Digital Video Broadcasting-Satellite services to Handhelds (DVB-SH) of Europe and satellite Digital Multimedia Broadcasting (DMB) of Korea, regardless of access standards such as an orthogonal frequency multiple access (OFMA) standard, a code division multiple access (CDMA) standard, a time division multiple access (TDMA) standard, and the like.

FIG. 3 illustrates a configuration of a mobile satellite communication apparatus with a complementary terrestrial component applying a fractional frequency reuse technique according to an embodiment of the present invention.

Referring to FIG. 3, the mobile satellite communication apparatus may include a satellite network 300, a terrestrial network 310, and a mobile terminal 320.

The satellite network 300 may include a satellite gateway 301, a geostationary satellite 303, and a type of a complementary terrestrial component, for example, a CGC 305. The satellite gateway 301 may be connected to a communication service providing apparatus via a network. The geostationary satellite 303 may relay data between the satellite gateway 301 and the mobile terminal 320. The CGC 305 may relay between the geostationary satellite 303 and the mobile terminal 320. The geostationary satellite 303 may include a single geostationary satellite group or a plurality of geostationary satellite groups. Here, when communicating with the mobile terminal 320, the geostationary satellite 303 may reuse the same frequency band for multiple beams and in this instance, may perform communication using a different subcarrier group for each beam. Therefore, as a subcarrier group unused by another beam is reused, the CGC 305 may transmit a satellite signal to the mobile terminal 320. In this instance, the CGC 305 may communicate with the mobile terminal 320 using a subcarrier group that is unused for a communication between the geostationary satellite 303 and the mobile terminal 320 in each beam, and thereby enhance a frequency use efficiency.

The terrestrial network 310 may include a terrestrial mobile base station 311 that connects the mobile terminal 320 and the communication service providing apparatus via the network, and a core network 313.

The mobile terminal 320 may use the communication service via the satellite network 300 and the terrestrial network 310, that is, a satellite and a terrestrial convergence network.

The mobile terminal 320 may be located in a single beam. When the mobile terminal 320 is moving, the mobile terminal 320 may be located in a plurality of beams. Here, the mobile terminal 320 may receive the telecommunication service via a satellite in the countryside or in the suburbs where a Line of Sight (LOS) is secured. Conversely, in urban areas or indoor environments where a satellite signal is not secured due to many buildings, the mobile terminal 320 may receive the telecommunication service via the CGC 305. When communicating with the geostationary satellite 303, the mobile terminal 320 may reuse the same frequency band in multiple beams and in this instance, perform communication using a different subcarrier group for each beam. Accordingly, the mobile terminal 320 may reuse a subcarrier group unused in another beam. Also, the mobile terminal 320 may communicate with the CGC 305 using a subcarrier group not used for a communication with the geostationary satellite 303.

According to an embodiment of the present invention, a mobile satellite communication apparatus may reuse the same frequency band in all the beams and may also perform a communication between a mobile terminal and a complementary terrestrial component using a subcarrier group unused for a communication between the mobile terminal and a satellite. Specifically, since a fractional frequency reuse is enabled, it is possible to enhance spectral efficiency. Also, since the same frequency band is used in all the beams, there is no need to change a frequency every time the mobile terminal moves a beam to another beam. Also, it is possible to decrease used frequencies.

Figure 4:
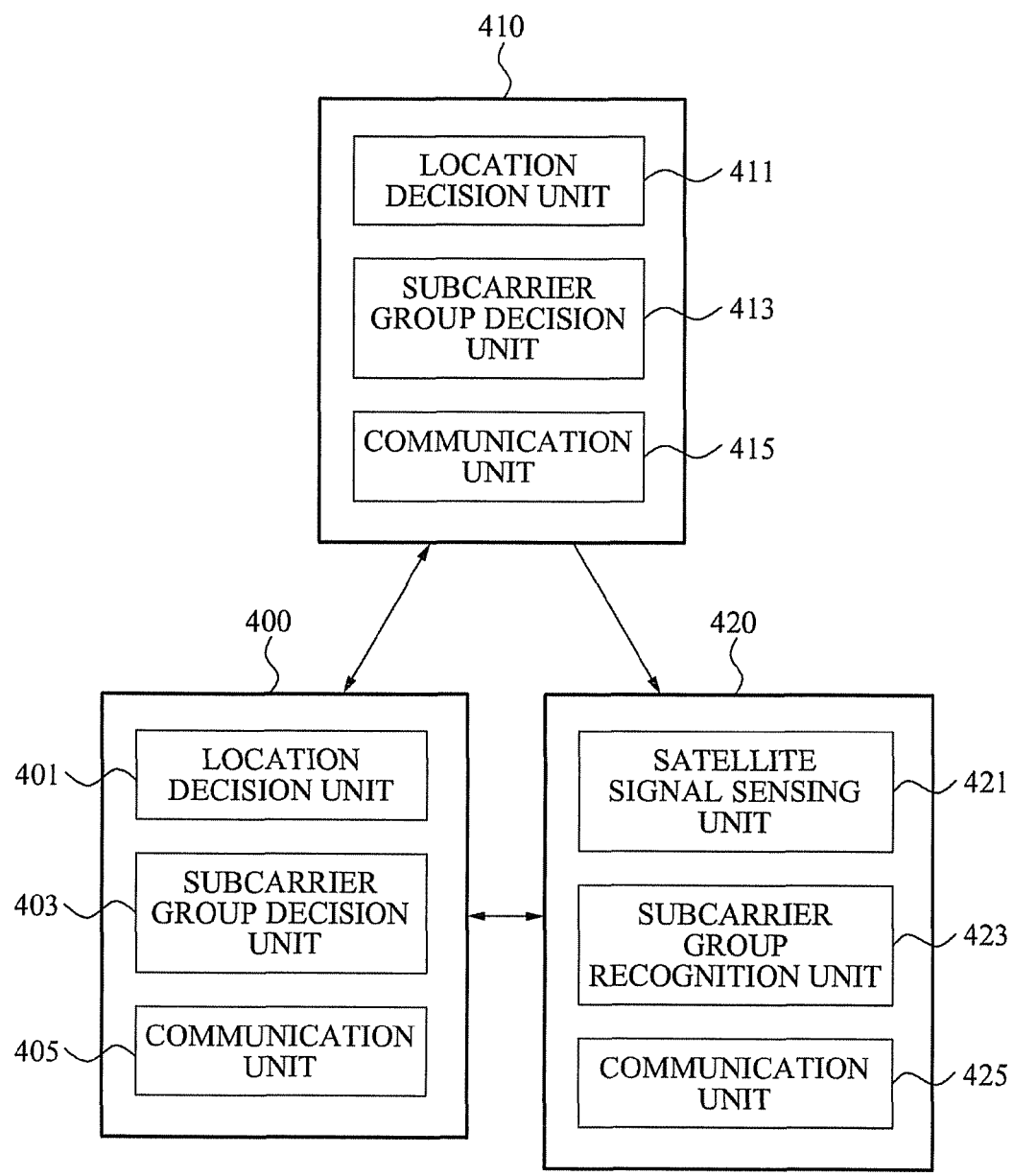
FIG. 4 is a block diagram illustrating a configuration of a mobile terminal, a satellite, and a complementary terrestrial component of a mobile satellite communication apparatus according to an embodiment of the present invention.
Figure 5:
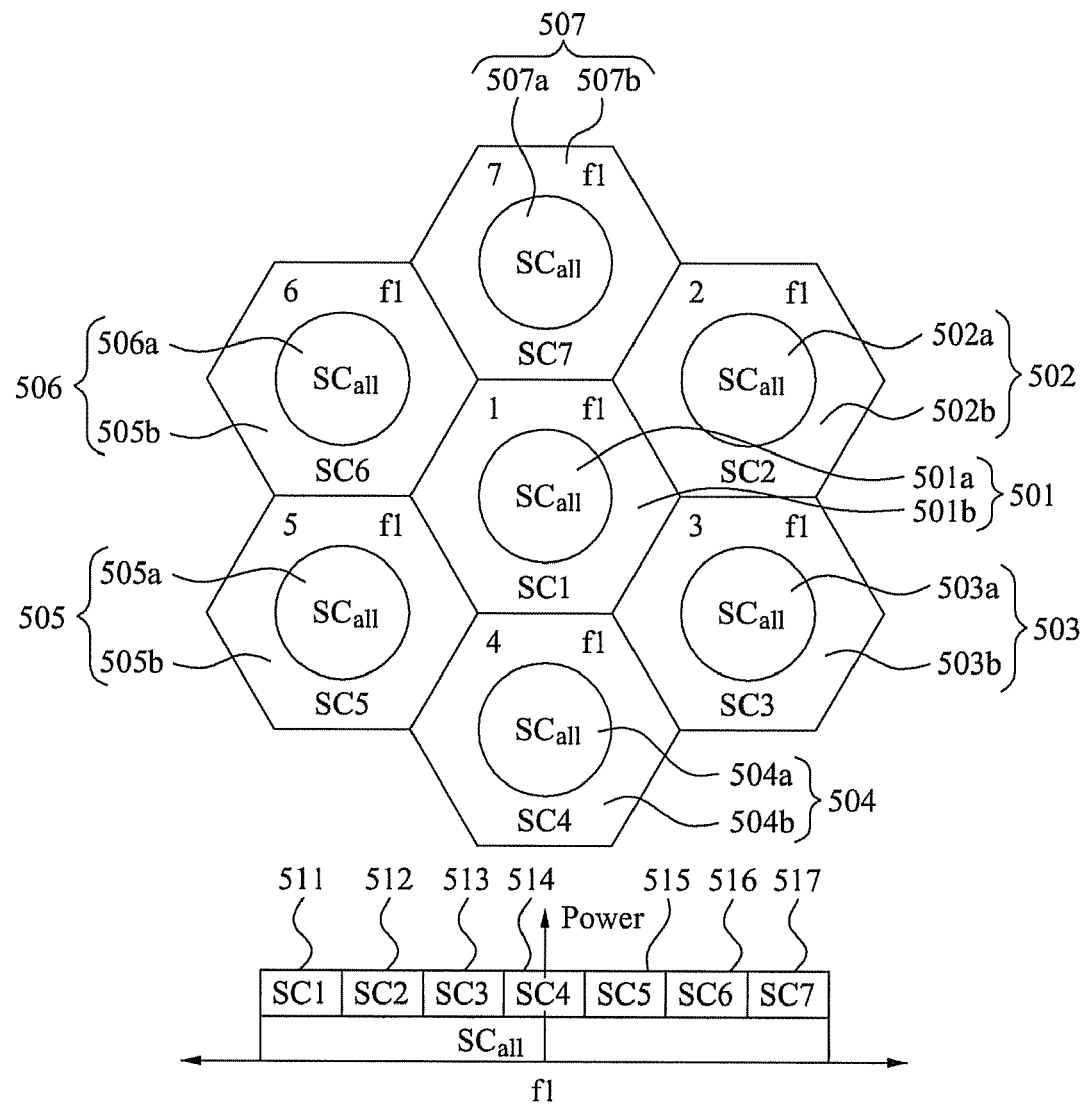
FIG. 5 illustrates a beam plan that is used in a mobile satellite communication apparatus and of which a frequency reuse rate is 1 according to an embodiment of the present invention.

FIG. 4 is a block diagram illustrating a configuration of a mobile terminal 400, a satellite 410, and a complementary terrestrial component 420 of a mobile satellite communication apparatus according to an embodiment of the present invention, and FIG. 5 illustrates a beam plan that is used in a mobile satellite communication apparatus and of which a frequency reuse rate is 1 according to an embodiment of the present invention.

Referring to FIGS. 4 and 5, the mobile satellite communication apparatus denotes an orthogonal frequency division multiplexing (OFDM) based multi-beam satellite system that may reuse the same frequency band in all the beams. The mobile satellite communication apparatus may include the mobile terminal 400, the satellite 410, and the complementary terrestrial component 420.

The mobile terminal 400 may include a location decision unit 401, a subcarrier group decision unit 403, and a communication unit 405.

When an access to the satellite 410 is attempted, the location decision unit 401 may receive location information of the mobile terminal 400 from the satellite 410 and determine a location of the mobile terminal 400 within multiple beams 501, 502, 503, 504, 505, 506, and 507.

Figure 6:
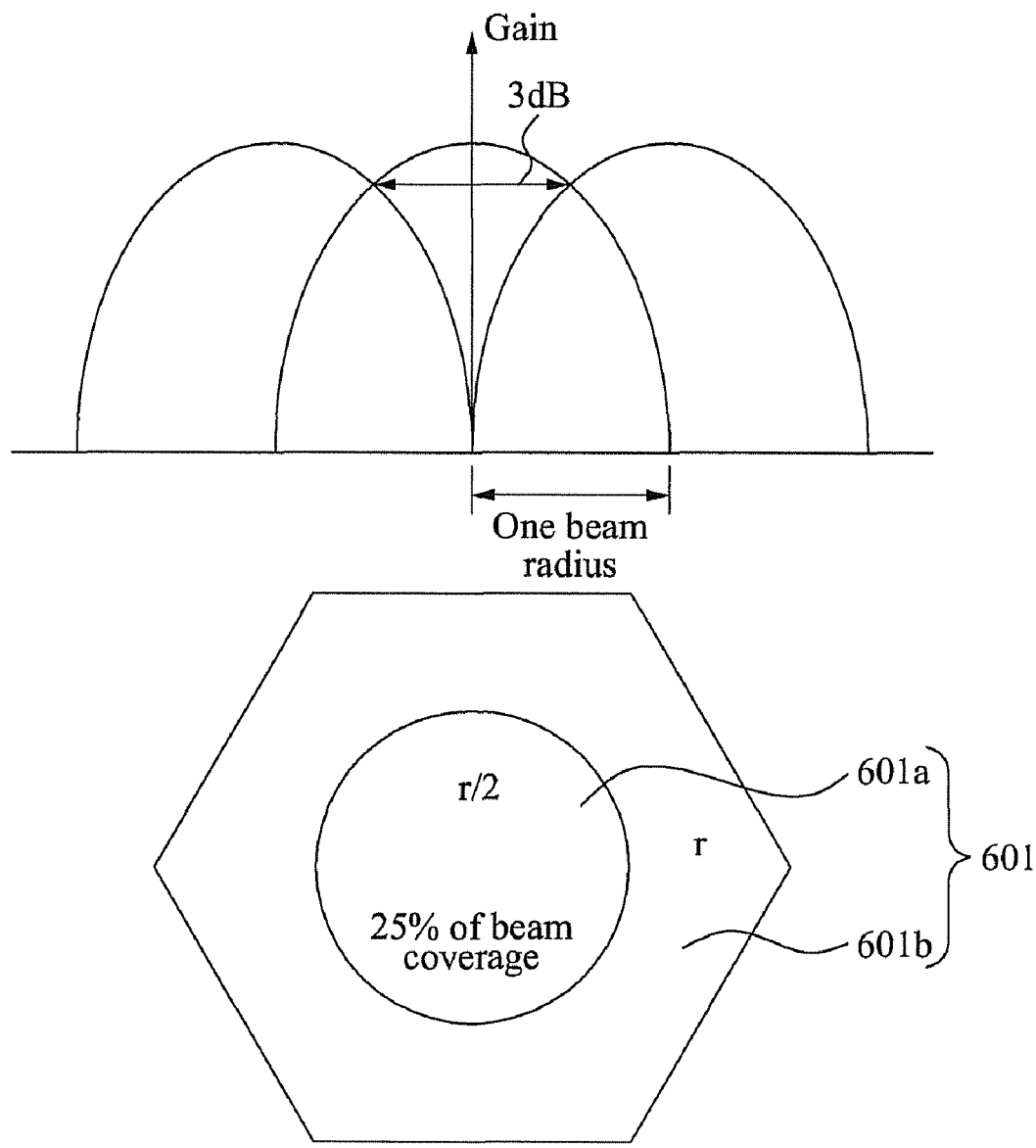
FIG. 6 illustrates a form of a beam used in a mobile satellite communication apparatus according to an embodiment of the present invention.

In this instance, the location decision unit 401 may determine, among the multiple beams 501, 502, 503, 504, 505, 506, and 507, a beam that includes the location of the mobile terminal 400, and may determine, between a central region 501a, 502a, 503a, 504a, 505a, 506a, or 507a, and a boundary region 501b, 502b, 503b, 504b, 505b, 506b, or 507b of the determined beam, a region that includes the location of the mobile terminal 400. As shown in FIG. 6, a beam 601 may be in a hexagonal shape that includes a central region 601a and a boundary region 61b, but the present invention is not limited thereto. The coverage of the beam 601 may be defined as a distance having a loss of 3 dB from a center of the beam 601. In this case, as the central region 601a is defined as a distance corresponding to a half of the radius of the beam 601, the central region 601a may reuse all the frequencies in 25 percentages of the coverage and the boundary region 601b may reuse a fractional frequency in the remaining 75 percentage of the coverage.

The subcarrier group decision unit 403 may determine a subcarrier group for a communication with the satellite 410 according to the location of the mobile terminal 400 within the multiple beams 501, 502, 503, 504, 505, 506, and 507.

Specifically, when the region that includes the location of the mobile terminal 400 is any one of the boundary regions 501b, 502b, 503b, 504b, 505b, 506b, and 507b, the subcarrier group decision unit 403 may generate a subcarrier selection using a plurality of different subcarrier groups 511, 512, 513, 514, 515, 516, and 517, and determine a single subcarrier group corresponding to the beam that includes the location of the mobile terminal 400, as a subcarrier group for a communication with the satellite 410. Although the subcarrier section may be generated using seven different subcarrier groups in FIG. 5, the present invention is not limited thereto. When the region that includes the location of the mobile terminal 400 is any one of the central regions 501a, 502a, 503a, 504a, 505a, 506a, or 507a, the subcarrier group decision unit 403 may determine all the subcarrier groups 511, 512, 513, 514, 515, 516, and 517 as subcarrier groups for the communication with the satellite 410.

The communication unit 405 may communicate with the satellite 410 using the subcarrier group for the communication with the satellite 410.

The satellite 410 may include a location decision unit 411, a subcarrier group decision unit 413, and a communication unit 415.

The location decision unit 411 may verify a location of the mobile terminal 400 using a signal strength of data received from the mobile terminal 400, and determine the location of the mobile terminal 400 within the multiple beams 501, 502, 503, 504, 505, 506, and 507.

In this instance, the location decision unit 411 may determine, among the multiple beams 501, 502, 503, 504, 505, 506, and 507, the beam that includes the location of the mobile terminal 400, and may determine, between the central region 501a, 502a, 503a, 504a, 505a, 506a, or 507a, and the boundary region 501b, 502b, 503b, 504b, 505b, 506b, or 507b of the determined beam, the region that includes the location of the mobile terminal 400.

The subcarrier group decision unit 413 may determine a subcarrier group for a communication with the mobile terminal 400 according to the location of the mobile terminal 400 within the multiple beams 501, 502, 503, 504, 505, 506, and 507.

Specifically, when the region that includes the location of the mobile terminal 400 is any one of the boundary regions 501b, 502b, 503b, 504b, 505b, 506b, and 507b, the subcarrier group decision unit 413 may generate a subcarrier selection using a plurality of different subcarrier groups 511, 512, 513, 514, 515, 516, and 517, and determine a single subcarrier group corresponding to the beam that includes the location of the mobile terminal 400, as a subcarrier group for a communication with the mobile terminal 400. Here, the subcarrier group decision unit 413 may generate the subcarrier section, using the same subcarrier groups as the different subcarrier groups generated in the mobile terminal 400. When the region that includes the location of the mobile terminal 400 is any one of the central regions 501a, 502a, 503a, 504a, 505a, 506a, or 507a, the subcarrier group decision unit 413 may determine all the subcarrier groups 511, 512, 513, 514, 515, 516, and 517 as subcarrier groups for the communication with the mobile terminal 400.

Figure 7:
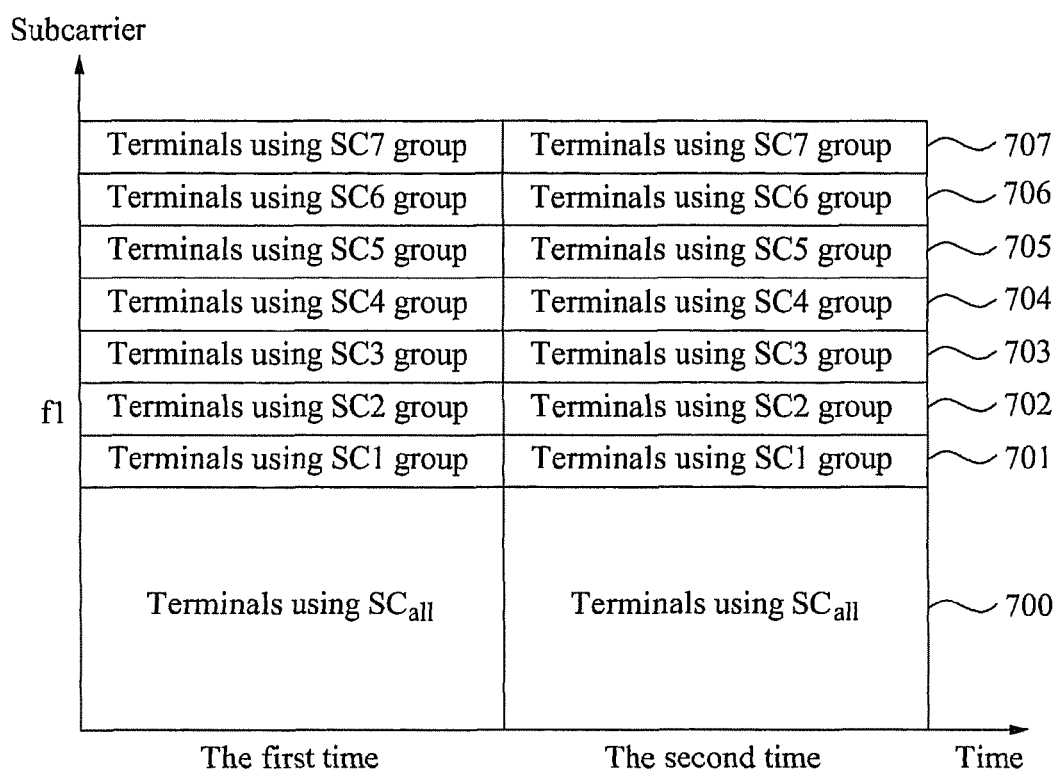
FIG. 7 illustrates a frequency multiplexing of subcarrier groups corresponding to multiple beams in a mobile satellite communication apparatus according to an embodiment of the present invention.

As shown in FIG. 7, the subcarrier group decision unit 413 may determine subcarrier groups for a communication with the mobile terminal 400 through frequency multiplexing. This is to decrease signal interference between mobile terminals by discerning a mobile terminal that is located in a central region of a beam from a mobile terminal that is located in a boundary region of the beam. Specifically, when a region that includes the location of the mobile terminal 400 is the central region of the beam, the subcarrier group decision unit 413 may determine a particular subcarrier section 700 of the entire subcarrier section as a subcarrier group for the communication with the mobile terminal 400. When the region that includes the location of the mobile terminal 400 is the boundary region of the beam, the subcarrier group decision unit 413 may generate the remaining subcarrier section excluding the particular subcarrier section 700, using a plurality of different subcarrier groups 701, 702, 703, 704, 705, 706, and 707, and may determine, among the plurality of subcarrier groups 701, 702, 703, 704, 705, 706, and 707, a single subcarrier group corresponding to the beam that includes the location of the mobile terminal 400 as the subcarrier group for the communication with the mobile terminal 400.

The communication unit 415 may communicate with the mobile terminal 400 using the subcarrier group for the communication with the mobile terminal 400.

Figure 8:
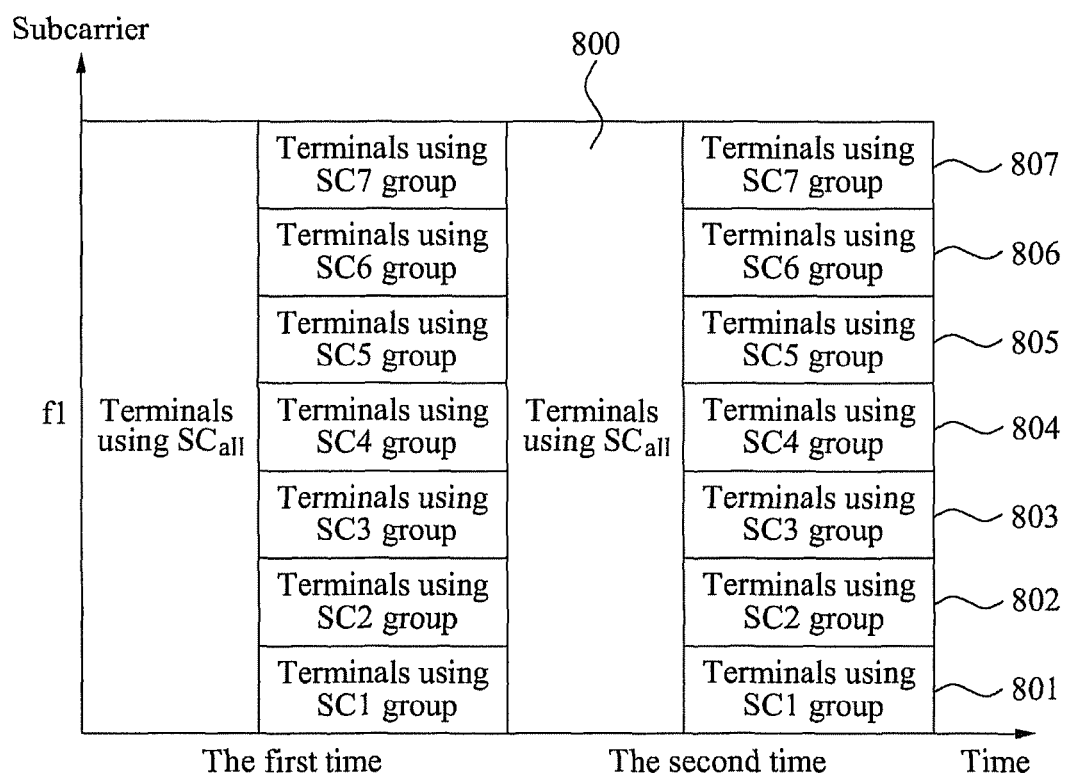
FIG. 8 illustrates a time multiplexing of subcarrier groups corresponding to multiple beams in a mobile satellite communication apparatus according to an embodiment of the present invention.

As shown in FIG. 8, the communication unit 415 may perform time multiplexing for data 800 to be transmitted to a mobile terminal that is located in a central region of a beam, and data 801, 802, 803, 804, 805, 806, and 807 to be transmitted to a mobile terminal that is located in a boundary region of the beam, and transmit the time-multiplexed data to the corresponding mobile terminals. Here, although thee communication unit 415 performs time multiplexing for the data 800 and the data 801, 802, 803, 804, 805, 806, and 807 within a single frame, the communication unit 415 may perform time multiplexing for data to be transmitted to the mobile terminal that is located in the central region of the beam and data to be transmitted to the mobile terminal that is located in the boundary region of the beam for each frame within a plurality of frames.

The communication unit 415 may perform transmission so that the power of data to be transmitted to the mobile terminal that is located in the central region of the beam may be less than the power of data to be transmitted to the mobile terminal that is located in the boundary region of the beam. Specifically, time multiplexing between the data to be transmitted to the mobile terminal that is located in the central region of the beam and the data to be transmitted to the mobile terminal that is located in the boundary region of the beam, and the adjustment of the power therebetween may be performed in order to decrease signal interference between mobile terminals.

The complementary terrestrial component 420 may include a satellite signal sensing unit 421, a subcarrier group recognition unit 423, and a communication unit 425.

When data is received from the mobile terminal 400, the satellite signal sensing unit 421 may sense a satellite signal.

The subcarrier group recognition unit 423 may recognize a subcarrier group used for a communication between the satellite 410 and the mobile terminal 400, and a subcarrier group unused for the communication between the satellite 410 and the mobile terminal 400.

In the case of a data transmission section to the mobile terminal 400 that is located in any one of the boundary regions 501b, 502b, 503b, 504b, 505b, 506b, and 507b of the multiple beams 501, 502, 503, 504, 505, 506, and 507 in time multiplexing of the satellite 410, when the complementary terrestrial component 420 is located in any one of the central regions 501a, 502a, 503a, 504a, 505a, 506a, or 507a, the subcarrier group recognition unit 423 may recognize a first subcarrier group used for a communication between the satellite 410 and the mobile terminal that is located in the boundary region of the beam.

When the complementary terrestrial component 420 is located in any one of the boundary regions 501b, 502b, 503b, 504b, 505b, 506b, and 507b, the subcarrier group recognition unit 423 may recognize the first subcarrier group and a second subcarrier group used for a communication between the satellite 410 and the mobile terminal 420 that is located in a boundary region of a neighboring beam adjacent to the beam.

The communication unit 425 may communicate with the mobile terminal 400 using the remaining subcarrier groups excluding the subcarrier group used for the communication between the satellite 410 and the mobile terminal 400.

In the case of a data transmission section to a mobile terminal that is located in a boundary region of a beam using a single subcarrier group in a communication between the mobile terminal and a satellite according to time multiplexing, subcarrier groups that a complementary terrestrial component may use for a communication with the mobile terminal will be described with reference to FIG. 9.

Figure 9:
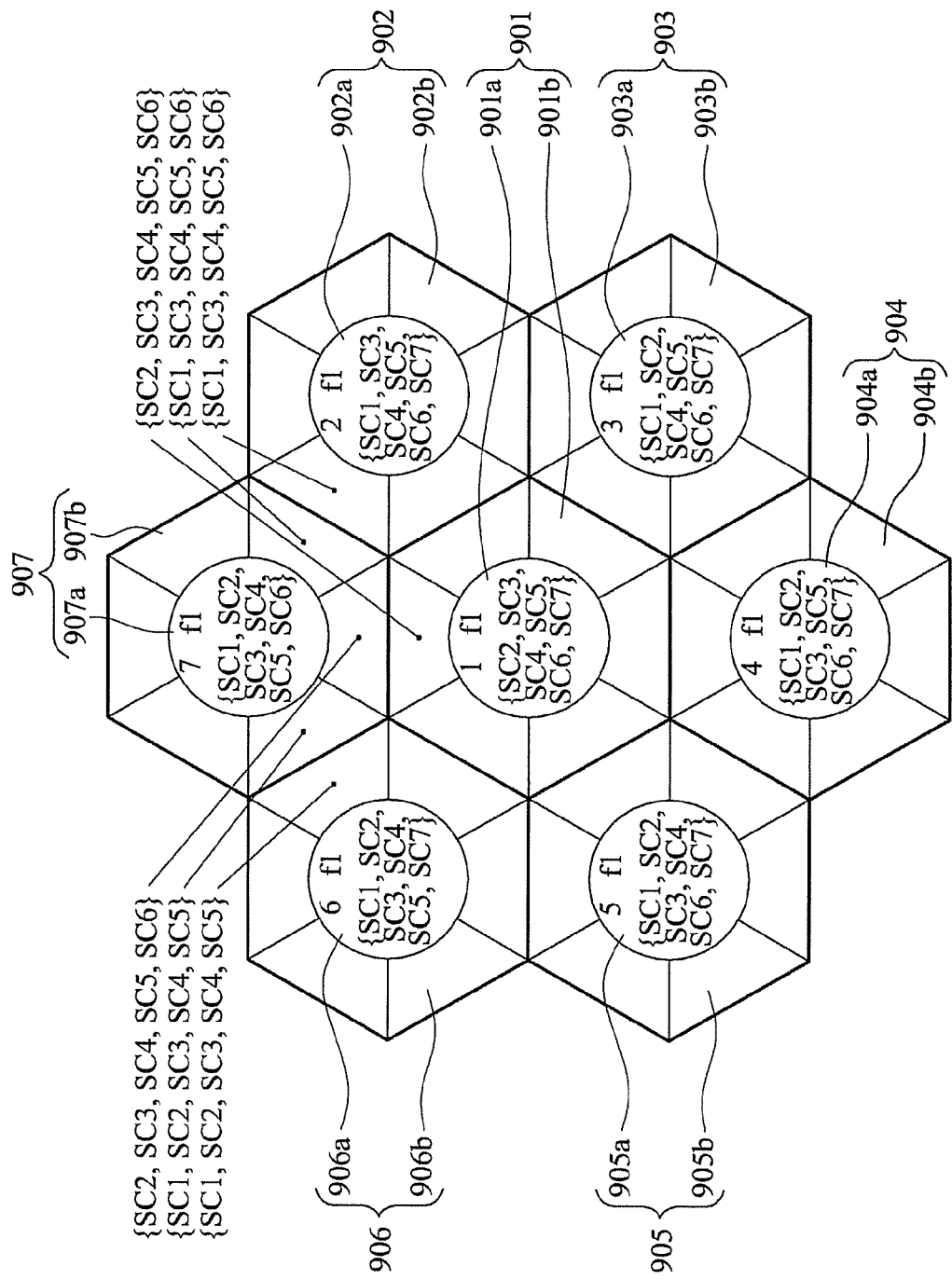
FIG. 9 illustrates a subcarrier group reusable by a complementary terrestrial component for each location within multiple beams in a mobile satellite communication apparatus according to an embodiment of the present invention.

Referring to FIG. 9, when the complementary terrestrial component 420 is located in a central region 901a of a first beam 901, the satellite 410 and the mobile terminal 400 that is located in a boundary region 901b of the first beam 901 may use a subcarrier group SC1 as a first subcarrier group. Therefore, the complementary terrestrial component 420 may communicate with the mobile terminal 400 using the remaining subcarrier groups SC2, SC3, SC4, SC5, SC6, and SC7 excluding the subcarrier group SC1 used as the first subcarrier group. When the complementary terrestrial component 420 is located in a central region 907a of a seventh beam 907, the satellite 410 and the mobile terminal 400 that is located in a boundary region 907b of the seventh beam 907 may use the subcarrier group SC7 as the first subcarrier group. The complementary terrestrial component 420 may communicate with the mobile terminal 400 using the remaining subcarrier groups SC1, SC2, SC3, SC4, SC5, and SC6 excluding the subcarrier group SC7 used as the first subcarrier group.

When the complementary terrestrial component 420 is located in the boundary region 901b of the first beam 901 that is adjacent to the seventh beam 907, the complementary terrestrial component 420 may communicate with the mobile terminal 400 that is located in the boundary region 901b of the first beam 901, using the remaining subcarrier groups SC2, SC3, SC4, SC5, and SC6 excluding the subcarrier group SC1 used as the first subcarrier group for the communication between the satellite 410 and the mobile terminal 400 that is located in the boundary region 901b of the first beam 901, and the subcarrier group SC7 used as a second subcarrier group for the communication between the satellite 410 and the mobile terminal 400 that is located in the boundary region 907b of the seventh beam 607 adjacent to the first beam 901. Also, when the complementary terrestrial component 420 is located in the boundary region 907b of the seventh beam 907 that is adjacent to the first beam 901, the complementary terrestrial component 420 may communicate with the mobile terminal 400 using the remaining subcarrier groups SC2, SC3, SC4, SC5, and SC6 excluding the subcarrier group SC7 used as the first subcarrier group for the communication between the satellite 410 and the mobile terminal 400 that is located in the boundary region 907b of the seventh beam 907, and the subcarrier group SC1 used as the second subcarrier group for the communication between the satellite 410 and the mobile terminal 400 that is located in the boundary region 901b of the first beam 901 adjacent to the seventh beam 907.

In a mobile satellite communication apparatus according to an embodiment of the present invention, when it is assumed that a length of a section capable of using all of N subcarriers is the same as a length of a section capable of using only a portion of subcarriers, it may be assumed that, when all the beams, for example, seven beams use a single frequency band, 4N/7 subcarriers capable of transmitting a signal may exist within each of the seven beams and 4N subcarriers may exist in the seven beams, and when the seven beams use seven frequency bands, 28N subcarriers capable of transmitting a signal may exist in seven beams. A conventional mobile satellite communication apparatus may use all the subcarriers in seven frequencies. Therefore, when a number of subcarriers is N, it may be assumed that 7N subcarriers capable of transmitting a signal may be included in seven beams in a single time slot. Accordingly, the mobile satellite communication apparatus according to an embodiment of the present invention may enhance spectral efficiency by four folds in comparison to the conventional mobile satellite communication apparatus.

FIG. 10 illustrates a beam plan that is used in a mobile satellite communication apparatus and of which a frequency reuse rate is I according to another embodiment of the present invention.

Referring to FIGS. 4 and 10, when the mobile terminal 400 is located in any one of central regions 1001a, 1002a, 1003a, 1004a, 1005a, 1006a, and 1007a of multiple beams, that is, first through seventh beams 1001, 1002, 1003, 1004, 1005, 1006, and 1007, the mobile terminal 400 and the satellite 410 may perform communication using all the subcarrier groups SC1, SC2, and SC3. However, when the mobile terminal 400 is located in any one of boundary regions 1001b, 1002b, 1003b, 1004b, 1005b, 1006b, and 1007b of the first through the seventh beams 1001, 1002, 1003, 1004, 1005, 1006, and 1007, the mobile terminal 400 and the satellite 410 may generate, for example, different three subcarrier groups SC1, SC2, and SC3, and may perform communication using a single subcarrier group corresponding to a beam that includes the mobile terminal 400. In this instance, each of mobile terminals located in other beams may communicate with the satellite 410 using the same subcarrier group, but may communicate with the satellite 410 using another subcarrier group different from mobile terminals included in neighboring beams. Through this, it is possible to decrease signal interference between the neighboring beams. Specifically, the mobile terminal 400 existing in the second beam 1002 and the mobile terminal 400 existing in the sixth beam 1006 may communicate with the satellite 410 using the same subcarrier group, for example, the subcarrier group SC1, whereas the mobile terminal 400 existing in the seventh beam 1007 adjacent to the second beam 1002 may communicate with the satellite 410 using a subcarrier group different from the subcarrier group SC1 used in the second beam 1002, for example, using the subcarrier group SC2.

Figure 11:
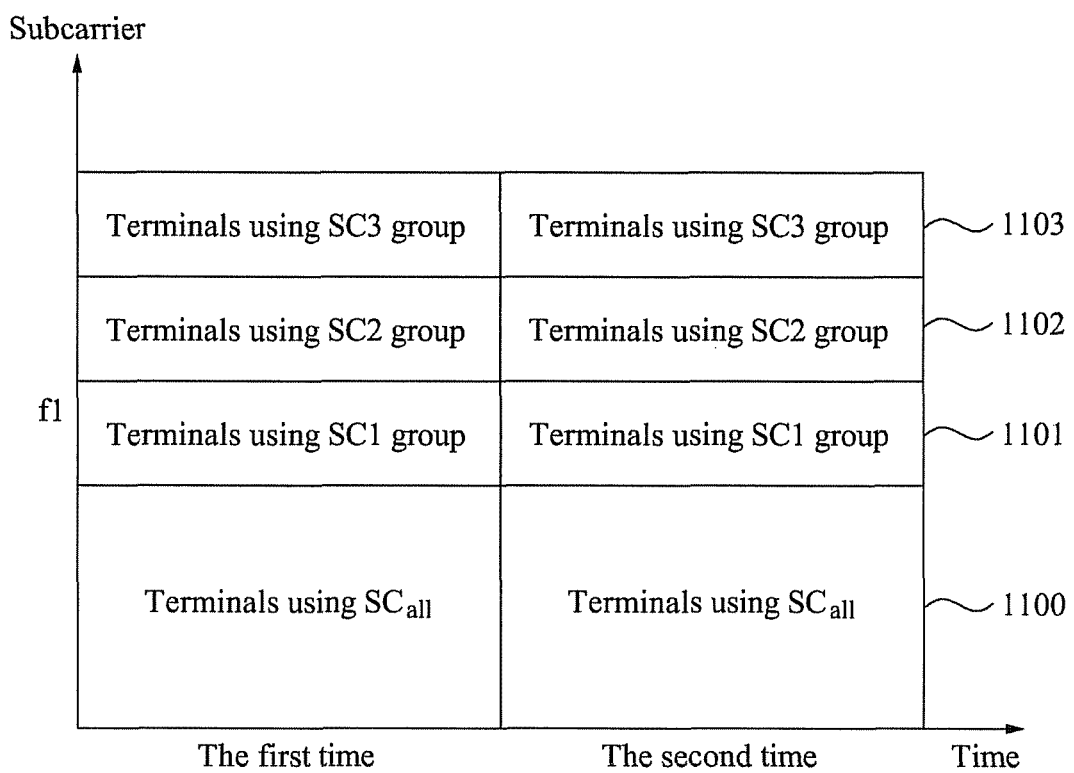
FIG. 11 illustrates a frequency multiplexing of subcarrier groups corresponding to multiple beams in a mobile satellite communication apparatus according to another embodiment of the present invention.

As shown in FIG. 11, the satellite 410 may perform frequency multiplexing and generate a plurality of subcarrier groups for a communication with the mobile terminal 400.

When the mobile terminal 400 is located in a central region of a beam, the satellite 410 may communicate with the mobile terminal 400 using a particular subcarrier group corresponding to a particular subcarrier section 1100 of the entire subcarrier section. When the mobile terminal 400 is located in a boundary region of the beam, the satellite 410 may generate the remaining subcarrier section excluding the particular subcarrier section 1100, using three different subcarrier groups 1101, 1102, and 1103. The satellite 410 may communicate with the mobile terminal 400 using a single subcarrier group corresponding to a beam that includes the mobile terminal 400, among the three subcarrier groups 1101, 1102, and 1103.

Figure 12:
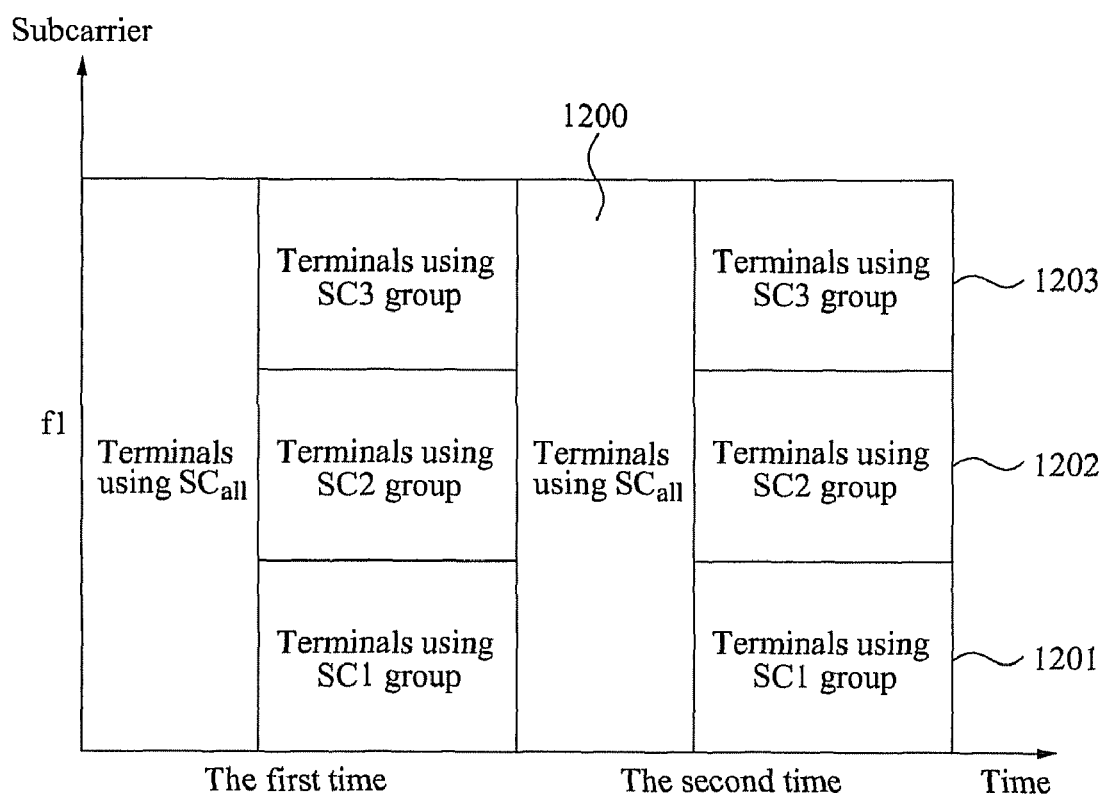
FIG. 12 illustrates a time multiplexing of subcarrier groups corresponding to multiple beams in a mobile satellite communication apparatus according to another embodiment of the present invention.

As shown in FIG. 12, the satellite 410 may perform time multiplexing for data 1200 to be transmitted to a mobile terminal that is located in a central region of a beam, and data 1201, 1202, and 1203 to be transmitted to a mobile terminal that is located in a boundary region of the beam, and transmit the time-multiplexed data to the corresponding mobile terminals.

The complementary terrestrial component 420 may recognize a subcarrier group used for a communication between the satellite 410 and the mobile terminal 400, and a subcarrier group unused for the communication between the satellite 410 and the mobile terminal 400, using a satellite signal, and then may communicate with the mobile terminal 400 using subcarrier groups excluding the subcarrier group used for the communication between the satellite 410 and the mobile terminal 400.

In the case of a data transmission section to the mobile terminal 400 that is located in any one of boundary regions of multiple beams, when the complementary terrestrial component 420 is located in any one of central regions of the multiple beams, the complementary terrestrial component 420 may communicate with the terminal 420 using subcarrier groups excluding a first subcarrier group used for the communication between the satellite 410 and the terminal 400 that is located in the boundary region of the beam. Also, when the complementary terrestrial component 420 is located in the boundary region of the beam, the complementary terrestrial component 420 may recognize the first subcarrier group used in the boundary region of the beam, and a second subcarrier group used for the communication between the satellite 410 and the mobile terminal 400 that is located in the boundary region of a neighboring beam adjacent to the beam, and may communicate with the mobile terminal 400 using the remaining subcarrier groups excluding the first subcarrier group and the second subcarrier group.

In the case of a data transmission section to a mobile terminal that is located in a boundary region of a beam using a singe subcarrier group in communication between the mobile terminal and a satellite according to time multiplexing, subcarrier groups that a complementary terrestrial component may use for a communication with the mobile terminal 400 will be described with reference to FIG. 13.

Figure 13:
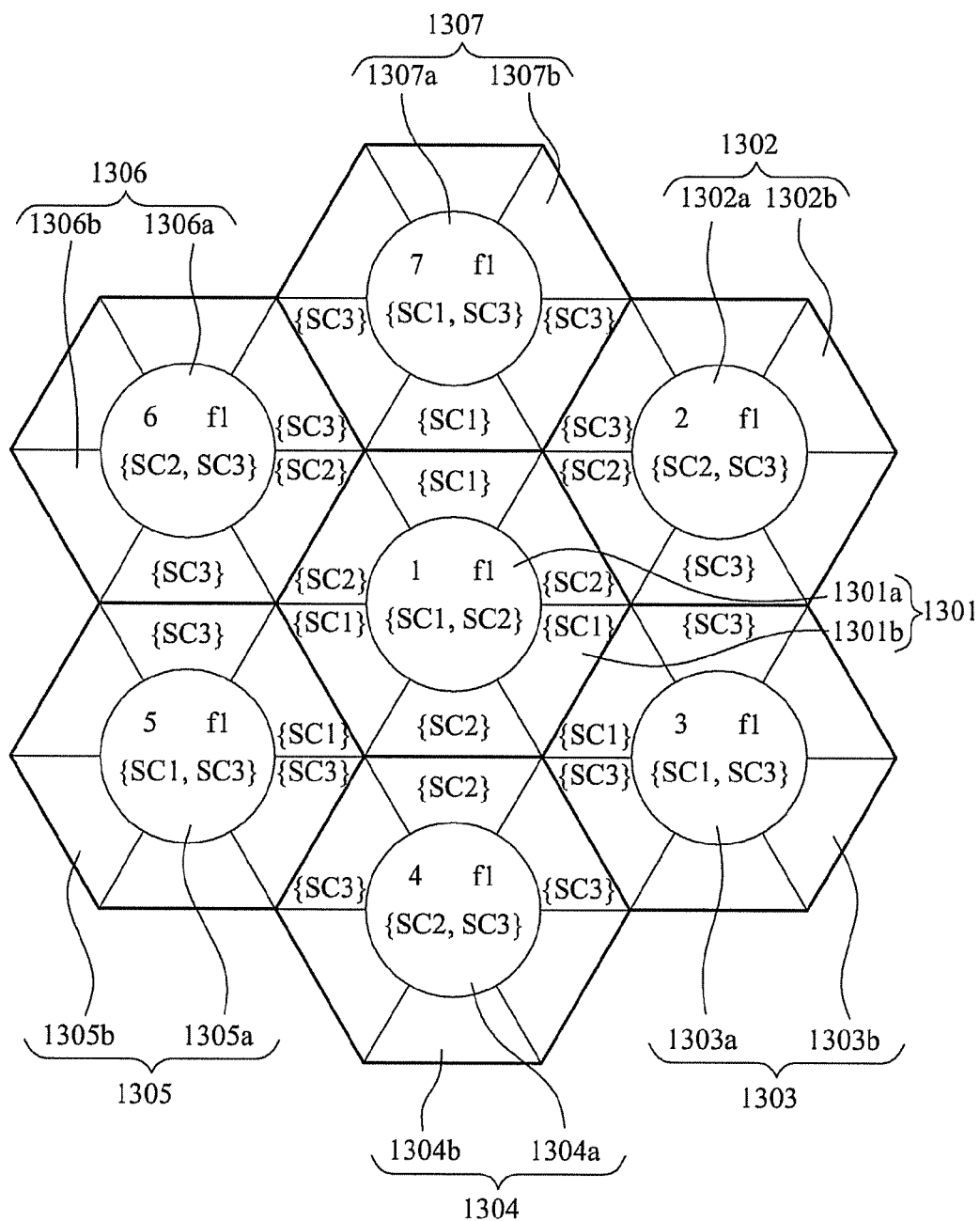
FIG. 13 illustrates a subcarrier group reusable by a complementary terrestrial component for each location within multiple beams in a mobile satellite communication apparatus according to another embodiment of the present invention.

Referring to FIG. 13, when the complementary terrestrial component 420 is located in a central region 1301a of a first beam 1301, the satellite 410 and the mobile terminal 400 that is located in a boundary region 1301b of the first beam 1301 may use a subcarrier group SC as a first subcarrier group. Therefore, the complementary terrestrial component 420 may communicate with the mobile terminal 400 that is located in the boundary region 1301b of the first beam 301, using the remaining subcarrier groups SC1 and SC2 excluding the subcarrier group SC3 used as the first subcarrier group. When the complementary terrestrial component 420 is located in a central region 1307a of a seventh beam 1307, the satellite 410 and the mobile terminal 400 that is located in a boundary region 1307b of the seventh beam 1307 may use the subcarrier group SC2 as a first subcarrier group. The complementary terrestrial component 420 may communicate with the mobile terminal 400 using the remaining subcarrier groups SC1 and SC3 excluding the subcarrier group SC2 used as the first subcarrier group.

When the complementary terrestrial component 420 is located in the boundary region 1301b of the first beam 1301 that is adjacent to the seventh beam 1307, the complementary terrestrial component 420 may communicate with the mobile terminal 400 using the subcarrier group SC1 excluding the subcarrier group SC3 used as the first subcarrier group for the communication between the satellite 410 and the mobile terminal 400 that is located in the boundary region 1301b of the first beam 1301, and the subcarrier group SC2 used as a second subcarrier group for the communication between the satellite 410 and the mobile terminal 400 that is located in the boundary region 1307b of the seventh beam 1307 adjacent to the first beam 1301. Also, when the complementary terrestrial component 420 is located in the boundary region 1307b of the seventh beam 1307 that is adjacent to the first beam 1301, the complementary terrestrial component 420 may communicate with the mobile terminal 400 using the subcarrier group SC1 excluding the subcarrier group SC2 used as the first subcarrier group for the communication between the satellite 410 and the mobile terminal 400 that is located in the boundary region 1307b of the seventh beam 1307, and the subcarrier group SC3 used as the second subcarrier group for the communication between the satellite 410 and the mobile terminal 400 that is located in the boundary region 1301b of the first beam 1301 adjacent to the seventh beam 1307.

In a mobile satellite communication apparatus according to another embodiment of the present invention, when it is assumed that a length of a section capable of using all of N subcarriers is the same as a length of a section capable of using only a portion of subcarriers, it may be assumed that, when all the beams, for example, three beams use a single frequency, 2N/3 subcarriers capable of transmitting a signal may exist within each of the three beams, and 2N subcarriers may exist in the three beams, and when the three beams use three frequency bands, 6N subcarriers capable of transmitting signal may exist in three beams. A conventional mobile satellite communication apparatus may use all the subcarriers in three frequencies. Therefore, when a number of subcarriers is N, it may be assumed that 3N subcarriers capable of transmitting a signal may be included in three beams in a single time slot. Accordingly, the mobile satellite communication apparatus according to an embodiment of the present invention may enhance a frequency efficiency by two folds in comparison to the conventional mobile satellite communication apparatus.

Figure 14:
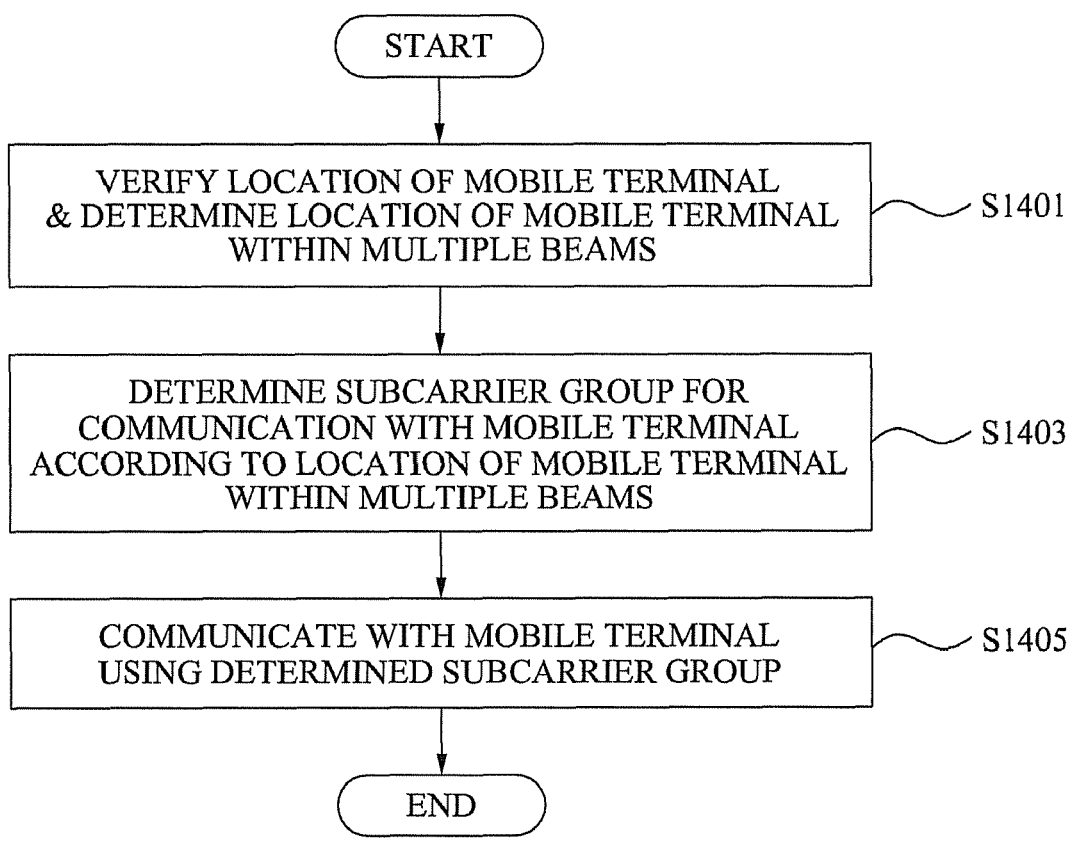
FIG. 14 is a flowchart illustrating a communication method of a satellite in a mobile satellite communication apparatus according to an embodiment of the present invention.

FIG. 14 is a flowchart illustrating a communication method of a satellite in a mobile satellite communication apparatus according to an embodiment of the present invention.

Referring to FIG. 14, the satellite may verify a location of a mobile terminal and determine the location of the mobile terminal within multiple beams in operation S1401.

The satellite may verify the location of the mobile terminal using data received from the mobile terminal and determine the location of the mobile terminal within the multiple beams.

Specifically, the satellite may determine a beam that includes the location of the mobile terminal, and may determine, between a central region and a boundary region of the determined beam, a region that includes the location of the mobile terminal.

In operation S1403, the satellite may determine a subcarrier group for a communication with the mobile terminal according to the location of the mobile terminal within the multiple beams.

Specifically, when the region that includes the location of the mobile terminal is the boundary region of the beam, the satellite may generate a subcarrier section using a plurality of different subcarrier groups and may determine a single subcarrier group corresponding to the beam that includes the location of the mobile terminal as the subcarrier group for the communication with the mobile terminal. Also, when the region that includes the location of the mobile terminal includes the central region of the beam, the satellite may determine all the subcarrier groups as subcarrier groups for the communication with the mobile terminal.

Also, the satellite may determine the subcarrier groups for the communication with each mobile terminal through frequency multiplexing. This is to decrease signal interference between mobile terminals by discerning a mobile terminal that is located in a central region of a beam from a mobile terminal that is located in a boundary region of the beam.

Specifically, when the region that includes the location of the mobile terminal is the central region of the beam, the satellite may determine a particular subcarrier section of the entire subcarrier section as the subcarrier group for the communication with the mobile terminal. When the region that includes the location of the mobile terminal is the boundary region of the beam, the satellite may generate the remaining subcarrier section excluding the particular subcarrier section, using a plurality of different subcarrier groups, and may determine, among the plurality of subcarrier groups, a single subcarrier group corresponding to a beam that includes the location of the mobile terminal as the subcarrier group for the communication with the mobile terminal.

In operation S1405, the satellite may communicate with the mobile terminal using the subcarrier group for the communication with the mobile terminal.

In this instance, the satellite may perform time multiplexing for data to be transmitted to the mobile terminal that is located in the central region of the beam, and data to be transmitted to the mobile terminal that is located in the boundary region of the beam, and transmit the time-multiplexed data to the corresponding mobile terminals. Here, although the satellite performs time multiplexing for the data to be transmitted to the mobile terminal that is located in the central region of the beam, and the data to be transmitted to the mobile terminal that is located in the boundary region of the beam in a single frame, the satellite may perform time multiplexing for data to be transmitted to the mobile terminal that is located in the central region of the beam and data to be transmitted to the mobile terminal that is located in the boundary region of the beam for each frame within a plurality of frames.

The satellite may perform transmission so that the power of data to be transmitted to the mobile terminal that is located in the central region of the beam may be less than the power of data to be transmitted to the mobile terminal that is located in the boundary region of the beam. Specifically, time multiplexing between the data to be transmitted to the mobile terminal that is located in the central region of the beam and the data to be transmitted to the mobile terminal that is located in the boundary region of the beam, and the adjustment of the power therebetween may be performed in order to decrease signal interference between mobile terminals.

A method of receiving, by a mobile terminal in a mobile satellite communication apparatus, location information of the mobile terminal from a satellite, to determine a location of the mobile terminal within multiple beams, and determining a subcarrier group for a communication with the satellite, and communicating with the satellite will be the same as the description made above with reference to FIG. 14 and thus further detailed description related thereto will be omitted here.

In a mobile satellite communication apparatus according to an embodiment of the present invention, a satellite and a mobile terminal may reuse the same frequency band in multiple beams and in this instance, may also use a different subcarrier group for each beam. Accordingly, it is possible to decrease interference between beams and to reuse a fractional frequency with respect to a subcarrier group unused in another beam.

Figure 15:
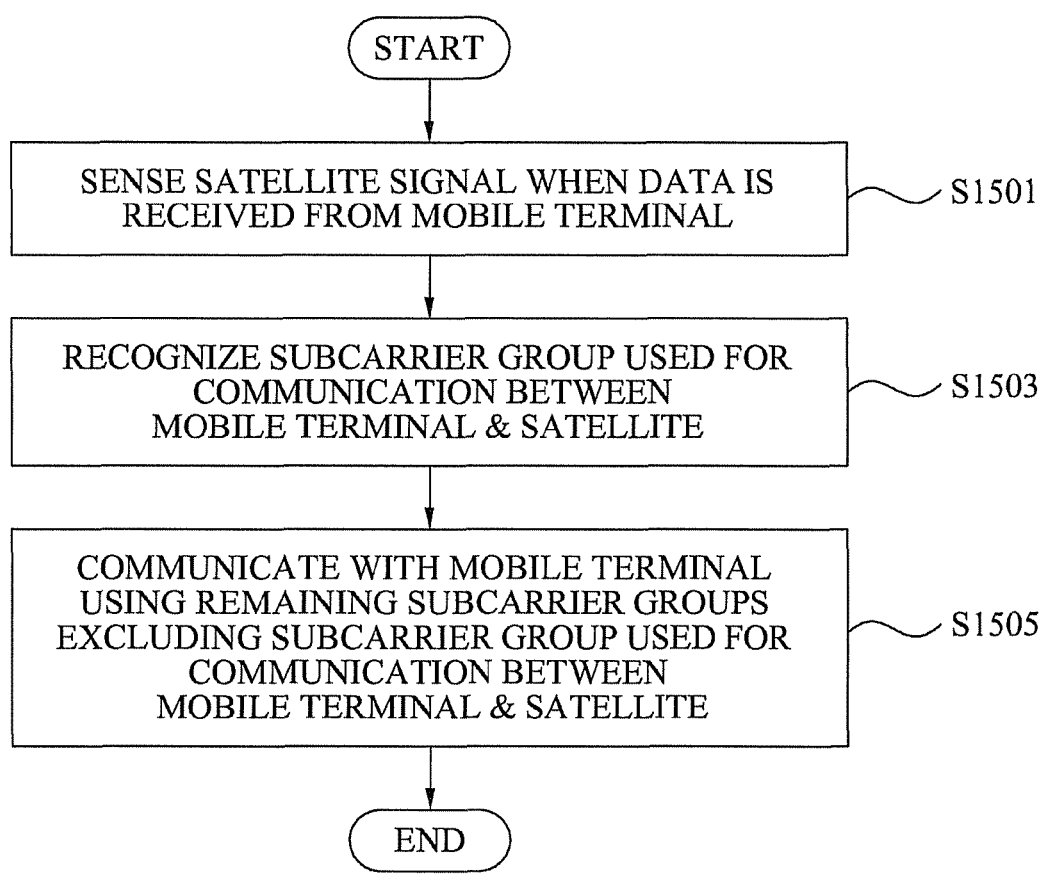
FIG. 15 is a flowchart illustrating a communication method of a complementary terrestrial component in a mobile satellite communication apparatus according to an embodiment of the present invention.

FIG. 15 is a flowchart illustrating a communication method of a complementary terrestrial component in a mobile satellite communication apparatus according to an embodiment of the present invention.

Referring to FIG. 15, when data is received from a mobile terminal, the complementary terrestrial component may sense a satellite signal in operation S1501.

When the mobile terminal fails to sense the satellite signal, the complementary terrestrial component may receive, from the mobile terminal, data to attempt an access to the complementary terrestrial component. Next, when the data is received from the mobile terminal, the complementary terrestrial component may sense the satellite signal.

In operation S1503, the complementary terrestrial component may recognize a subcarrier group used for a communication between the mobile terminal and the satellite.

Here, the complementary terrestrial component may recognize a subcarrier group used for the communication between the satellite and mobile terminals that are located in the beam where the complementary terrestrial component is located, and in a neighboring beam adjacent to the beam, and may also recognize a subcarrier group unused for the above communication. Accordingly, as the complementary terrestrial component recognizes a subcarrier group unused in the region, the complementary terrestrial component may determine the unused subcarrier group as the subcarrier group that may be used for the communication with the mobile terminal.

In operation S1505, the complementary terrestrial component may communicate with the mobile terminal using the remaining subcarrier groups excluding the subcarrier group used for the communication between the mobile terminal and the satellite.

Specifically, the complementary terrestrial component may communicate with the mobile terminal using the determined subcarrier group, that is, the subcarrier group unused for the communication between the satellite and the mobile terminals that are located in the beam where the complementary terrestrial component is located and in the neighboring beam adjacent to the beam.

FIG. 16 is a flowchart illustrating a communication method of a complementary terrestrial component in a mobile satellite communication apparatus to another embodiment of the present invention.

Referring to FIG. 16, when data is received from the mobile terminal, the complementary terrestrial component may sense a satellite signal in operation S1601.

When the mobile terminal fails to sense the satellite signal, the complementary terrestrial component may receive, from the mobile terminal, data to attempt an access to the complementary terrestrial component. Next, when the data is received from the mobile terminal, the complementary terrestrial component may sense the satellite signal.

In operation S1603, the complementary terrestrial component may recognize a first subcarrier group used for a communication between the mobile terminal and the satellite, using the satellite signal.

The complementary terrestrial component may receive, from the satellite, the subcarrier group used for the communication between the satellite and the mobile terminal that is located in the boundary region of the beam, every frame through a header of a transmission frame, a control channel, and the like.

In operation S1605, the complementary terrestrial component may determine the region where the complementary terrestrial component is located within a beam.

When the complementary terrestrial component is located in a central region of any one of multiple beams, the complementary terrestrial component may communicate with the mobile terminal using the remaining subcarrier groups excluding a first subcarrier group used for the communication between the satellite and the mobile terminal that is located in a boundary region of the beam in operation S 1607.

For example, referring to FIG. 9, when the complementary terrestrial component is located in the central region 901a of the first beam 901, the satellite and the mobile terminal that is located in the boundary region 901b of the first beam 901 may use the subcarrier group SC1 as a first subcarrier group. Therefore, the complementary terrestrial component may communicate with the mobile terminal using the remaining subcarrier groups SC2, SC3, SC4, SC5, SC6, and SC7 excluding the subcarrier group SC1 used as the first subcarrier group. When the complementary terrestrial component is located in the central region 907a of the seventh beam 907, the satellite and the mobile terminal that is located in the boundary region 907b of the seventh beam 907 may use the subcarrier group SC7 as the first subcarrier group. The complementary terrestrial component may communicate with the mobile terminal using the remaining subcarrier groups SC1, SC2, SC3, SC4, SC5, and SC6 excluding the subcarrier group SC7 used as the first subcarrier group.

When the complementary terrestrial component is located in a boundary region of any one of the multiple beams, the complementary terrestrial component may recognize a second subcarrier group used by a mobile terminal existing in a neighboring beam adjacent to the beam where the complementary terrestrial component is located for the communication with the satellite in operation S1609.

For example, referring to FIG. 9, when the complementary terrestrial component is located in the boundary region 901b of the first beam 901 that is adjacent to the seventh beam 907, the complementary terrestrial component may recognize, as a second subcarrier group, the subcarrier group SC7 that is used by a mobile terminal existing in the boundary region 907b of the seventh beam 907 for a communication with the satellite. When the complementary terrestrial component is located in the boundary region 907b of the seventh beam 907 adjacent to the first beam 901, the complementary terrestrial component may recognize, as a second subcarrier group, the subcarrier group SC1 that is used by the mobile terminal existing in the boundary region 901b of the first beam 901 for a communication with the satellite.

In operation S1611, the complementary terrestrial component may communicate with the mobile terminal using the remaining subcarrier groups excluding the first subcarrier group and the second subcarrier group.

For example, referring to FIG. 9, when the complementary terrestrial component is located in the boundary region 901b of the first beam 901 adjacent to the seventh beam 907, the complementary terrestrial component may communicate with the mobile terminal using the remaining subcarrier groups SC2, SC3, SC4, SC5, and SC6 excluding the subcarrier group SC7 used as the first subcarrier group and the subcarrier group SC1 used as the second subcarrier group.

In a mobile satellite communication apparatus according to an embodiment of the present invention, a complementary terrestrial component may communicate with a mobile terminal using a subcarrier group unused for a communication between the mobile terminal and the satellite. Through this, it is possible to reuse a fractional frequency and to thereby enhance a frequency use efficiency.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A communication method of a mobile terminal in an orthogonal frequency division multiplexing (OFDM) based multi-beam satellite system reusing the same frequency band for all the beams, the method comprising:
   receiving location information of the mobile terminal from a satellite to determine a location of the mobile terminal within multiple beams;
   determining a subcarrier group for a communication with the satellite according to the location of the mobile terminal within the multiple beams; and
   communicating with the satellite using the subcarrier group for the communication with the satellite.

2. The method of claim 1, wherein the receiving and the determining comprises:
   determining, among the multiple beams, a beam that includes the location of the mobile terminal; and
   determining, between a central region and a boundary region of the determined beam, a region that includes the location of the mobile terminal.

3. The method of claim 2, wherein the determining of the subcarrier group comprises:
   generating a subcarrier section using a plurality of different subcarrier groups to determine a single subcarrier group corresponding to the beam as the subcarrier group for the communication with the satellite, when the region that includes the location of the mobile terminal is the boundary region of the beam; and
   determining all the subcarrier groups as subcarrier groups for the communication with the satellite, when the region that includes the location of the mobile terminal is the central region of the beam.

4. A communication method of a satellite in an OFDM based multi-beam satellite system reusing the same frequency band for all the beams, the method comprising:
   verifying location information of the mobile terminal using data, received from the mobile terminal, to determine a location of the mobile terminal within multiple beams;
   determining a subcarrier group for a communication with the mobile terminal according to the location of the mobile terminal within the multiple beams; and
   communicating with the mobile terminal using the subcarrier group for the communication with the mobile terminal.

5. The method of claim 4, wherein the verifying and the determining comprises:
   determining, among the multiple beams, a beam that includes the location of the mobile terminal; and
   determining, between a central region and a boundary region of the determined beam, a region that includes the location of the mobile terminal.

6. The method of claim 5, wherein the determining of the subcarrier group comprises:
   generating a subcarrier section using a plurality of different subcarrier groups to determine a single subcarrier group corresponding to the beam as the subcarrier group for the communication with the mobile terminal, when the region that includes the location of the mobile terminal is the boundary region of the beam; and
   determining all the subcarrier groups as subcarrier groups for the communication with the mobile terminal, when the region that includes the location of the mobile terminal is the central region of the beam.

7. The method of claim 5, wherein time multiplexing is performed for data to be transmitted to a mobile terminal that is located in the central region of the beam, and data to be transmitted to a mobile terminal that is located in the boundary region of the beam, and the time-multiplexed data are transmitted to the corresponding mobile terminals.

8. The method of claim 5, wherein the power of data to be transmitted to a mobile terminal that is located in the central region of the beam is less than the power of data to be transmitted to a mobile terminal that is located in the boundary region of the beam.

9. The method of claim 5, wherein the determining of the subcarrier group comprises:
   determining a particular subcarrier section of the entire subcarrier section as the subcarrier group for the communication with the mobile terminal, when the region that includes the location of the mobile terminal is the central region of the beam; and
   generating the remaining subcarrier section excluding the particular subcarrier section, using a plurality of different subcarrier groups to determine, among the plurality of subcarrier groups, a single subcarrier group corresponding to the beam as the subcarrier group for the communication with the mobile terminal, when the region that includes the location of the mobile terminal is the boundary region of the beam.

10. A communication method of a complementary terrestrial component in an OFDM based multi-beam satellite system reusing the same frequency band for all the beams, the method comprising:
    sensing a satellite signal when data is received from a mobile terminal;
    recognizing a subcarrier group used for a communication between a satellite and the mobile terminal, using the satellite signal; and
    communicating with the mobile terminal using the remaining subcarrier groups excluding the recognized subcarrier group.

11. The method of claim 10, wherein the recognizing comprises:
    in a case where the satellite communicates with a mobile terminal that is located in a boundary region of any one of multiple beams,
    recognizing a first subcarrier group used for a communication between the satellite and the mobile terminal that is located in the boundary region of the beam, when the complementary terrestrial component is located in a central region of the beam,; and
    recognizing the first subcarrier group and a second subcarrier group used for a communication between the satellite and a mobile terminal that is located in a boundary region of a neighboring beam adjacent to the beam, when the complementary terrestrial component is located in the boundary region of the beam.

12. A mobile terminal in an OFDM based multi-beam satellite system reusing the same frequency band for all the beams, the mobile terminal comprising:
    a location decision unit to receive location information of the mobile terminal from a satellite, and to determine a location of the mobile terminal within multiple beams;

a subcarrier group decision unit to determine a subcarrier group for a communication with the satellite according to the location of the mobile terminal within the multiple beams; and a communication unit to communicate with the satellite using the subcarrier group for the communication with the satellite.

13. The mobile terminal of claim 12, wherein:

when a region that includes the location of the mobile terminal is a boundary region of any one of the multiple beams, the subcarrier group decision unit generates a subcarrier section using a plurality of different subcarrier groups and determines any one of the subcarrier groups as the subcarrier group for the communication with the satellite, and when the region that includes the location of the mobile terminal is a central region of any one of the multiple beams, the subcarrier group decision unit determines all the subcarrier groups as subcarrier groups for the communication with the satellite.

14. A complementary terrestrial component in an OFDM based multi-beam satellite system reusing the same frequency band for all the beams, the complementary terrestrial component comprising:

a satellite signal sensing unit to sense a satellite signal when data is received from a mobile terminal;

a subcarrier group recognition unit to recognize a subcarrier group used for a communication between a satellite and the mobile terminal, using the satellite signal; and a communication unit to communicate with the mobile terminal using the remaining subcarrier groups excluding the recognized subcarrier group.

15. The complementary terrestrial component of claim 14, wherein:

in a case where the satellite communicates with a mobile terminal that is located in a boundary region of any one of multiple beams, when the complementary terrestrial component is located in a central region of the beam, the subcarrier group recognition unit recognizes a first subcarrier group used for a communication between the satellite and the mobile terminal that is located in the boundary region of the beam, and when the complementary terrestrial component is located in the boundary region of the beam, the subcarrier group recognition unit recognizes the first subcarrier group and a second subcarrier group used for a communication between the satellite and a mobile terminal that is located in a boundary region of a neighboring beam adjacent to the beam.

* * * * *